(12) United States Patent
Scheibe

(10) Patent No.: US 8,302,933 B2
(45) Date of Patent: Nov. 6, 2012

(54) VALVE DEVICE

(75) Inventor: Ralf Scheibe, Kuenzelsau-Garnberg (DE)

(73) Assignee: Buerkert Werke GmbH, Ingelfingen (DE)

( * ) Notice: Subject to any disclaimer, the term of this patent is extended or adjusted under 35 U.S.C. 154(b) by 756 days.

(21) Appl. No.: 11/921,974

(22) PCT Filed: Jun. 27, 2006

(86) PCT No.: PCT/EP2006/006208
§ 371 (c)(1),
(2), (4) Date: Aug. 12, 2009

(87) PCT Pub. No.: WO2007/000321
PCT Pub. Date: Jan. 4, 2007

(65) Prior Publication Data
US 2009/0309055 A1    Dec. 17, 2009

(30) Foreign Application Priority Data

Jun. 27, 2005 (DE) .................... 20 2005 010 075 U
Apr. 28, 2006 (DE) .................... 20 2006 006 862 U

(51) Int. Cl.
*F16K 31/10* (2006.01)
(52) U.S. Cl. ............... 251/228; 251/129.17; 251/129.2; 251/335.1
(58) Field of Classification Search .......... 251/129.2, 251/129.17, 335.1, 231, 228
See application file for complete search history.

(56) References Cited

U.S. PATENT DOCUMENTS

| 627,671 | A | * | 6/1899 | Kelly ............................. 251/243 |
| 2,874,929 | A | * | 2/1959 | Klingler ................... 251/129.17 |
| 2,899,169 | A | * | 8/1959 | Klingler ......................... 251/107 |
| 2,912,012 | A | * | 11/1959 | Klingler ..................... 137/625.44 |
| 2,969,809 | A | * | 1/1961 | Klingler ........................ 137/625.3 |
| 3,429,552 | A | * | 2/1969 | Erickson et al. ......... 251/129.17 |
| 4,285,497 | A | * | 8/1981 | Gottel .......................... 251/129.2 |
| 5,027,857 | A | * | 7/1991 | Champseix .............. 137/625.44 |
| 5,205,323 | A | * | 4/1993 | Baker ....................... 137/625.44 |
| 5,755,426 | A | | 5/1998 | Boesch |
| 5,799,696 | A | * | 9/1998 | Weiss ........................ 137/625.44 |
| 6,145,806 | A | | 11/2000 | Dettmann |
| 6,286,547 | B1 | | 9/2001 | Dettmann |
| 6,588,727 | B2 | * | 7/2003 | Christoffersen et al. .. 251/129.2 |
| 2001/0023881 | A1 | * | 9/2001 | Magri ........................... 222/504 |

FOREIGN PATENT DOCUMENTS

| DE | 27 24 901 C2 | 12/1978 |
| DE | 24 57 019 C2 | 12/1981 |
| DE | 44 18 019 A1 | 11/1995 |
| DE | 298 22 958 U1 | 6/1999 |
| DE | 199 57 953 A1 | 6/2001 |
| DE | 201 19 401 U1 | 4/2002 |
| EP | 0 916 049 B1 | 12/1998 |

* cited by examiner

*Primary Examiner* — John K Fristoe, Jr.
*Assistant Examiner* — Time Aigbe
(74) *Attorney, Agent, or Firm* — Stuart J. Friedman

(57) ABSTRACT

A valve device has a valve space (14) formed in a housing (12a, 12b), a valve drive (16) sealed against the valve space (14) by means of a sealing body (26) made of an elastic material, a two-armed actuating lever (32) which extends through the sealing body and whose first arm (34) is connected to the valve drive (16), and a closing body (28) molded on the sealing body (26), which forms a jacket of the second arm (30) of the actuating lever (32). The closing body (28) can cover or clear a valve seat (24) disposed in a valve space (14) by a swivel movement of the actuating lever (32), wherein the actuating lever (32) includes a spatially fixed bearing axis.

12 Claims, 10 Drawing Sheets

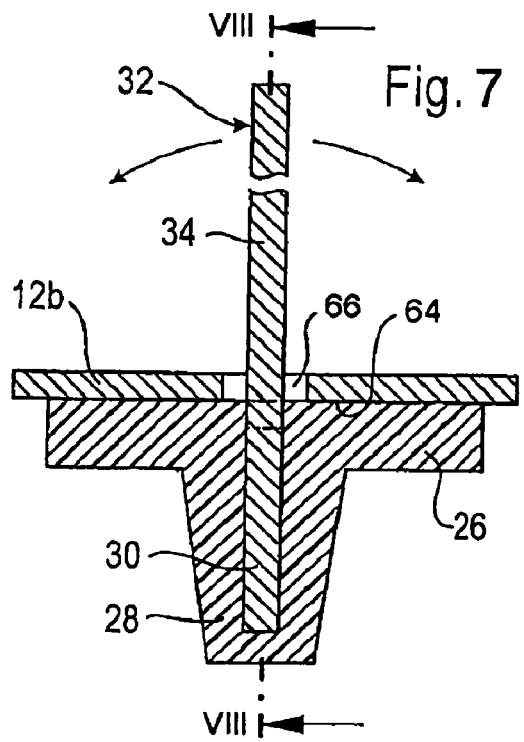
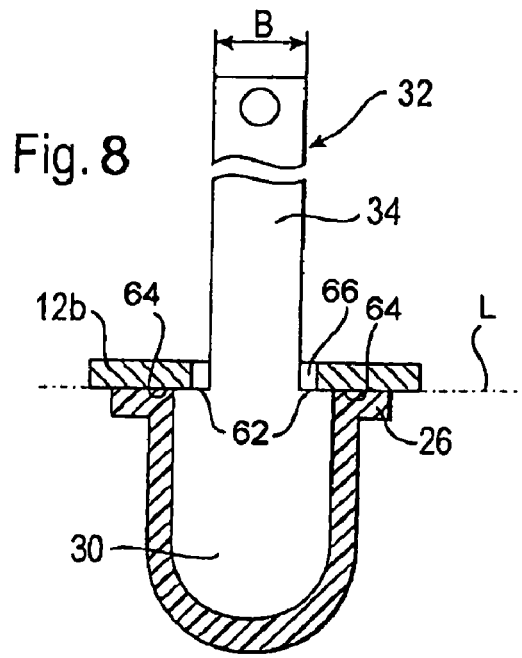
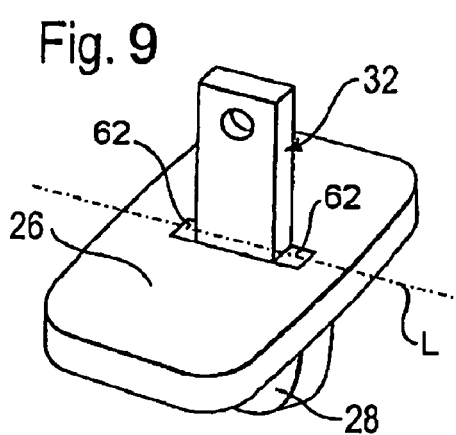
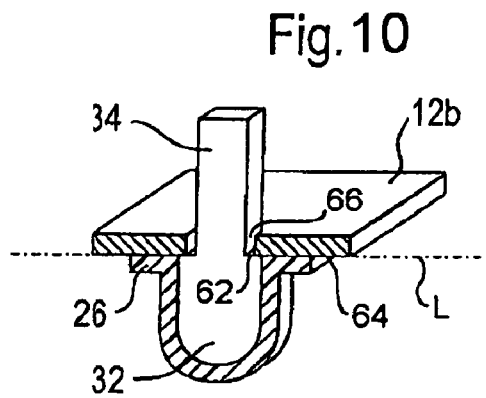
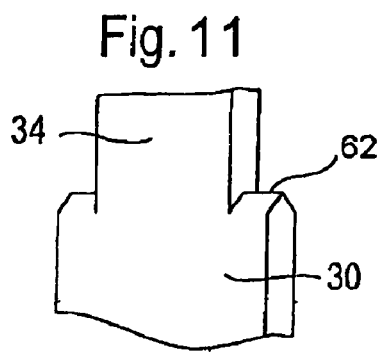

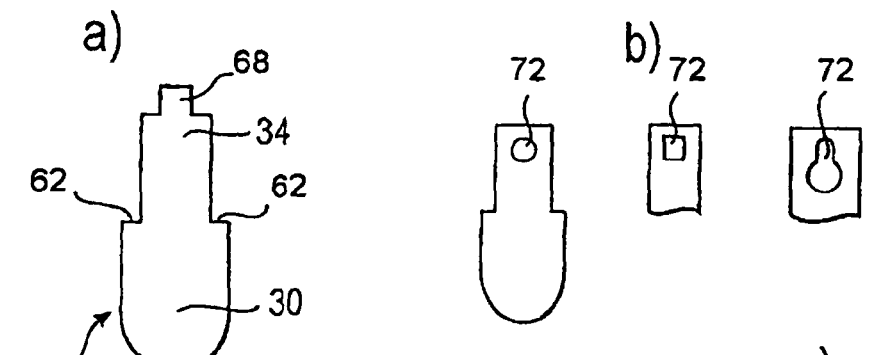
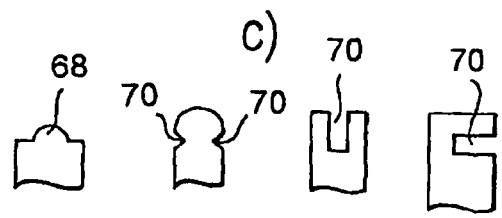
Fig. 14
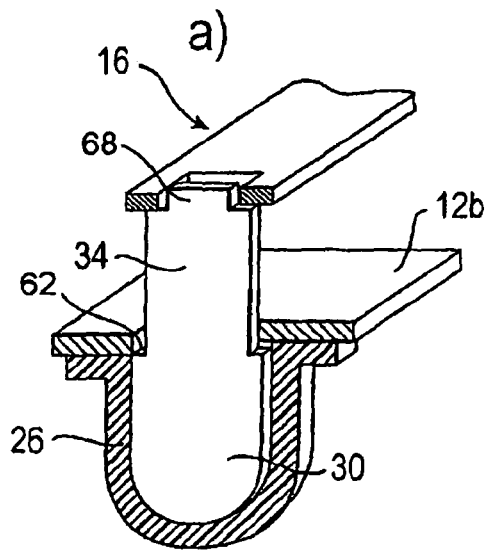
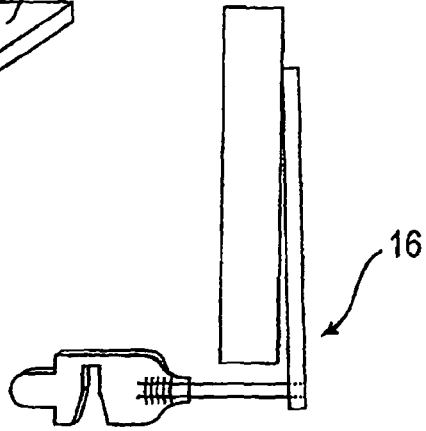
Fig. 15
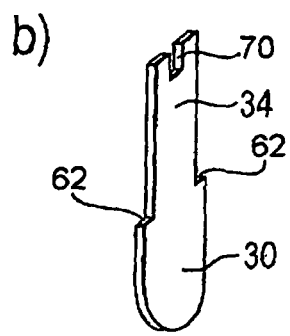
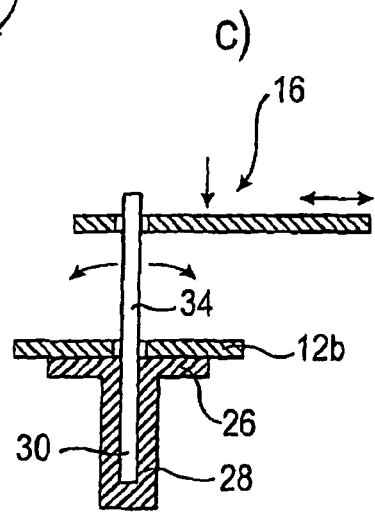

Fig. 16
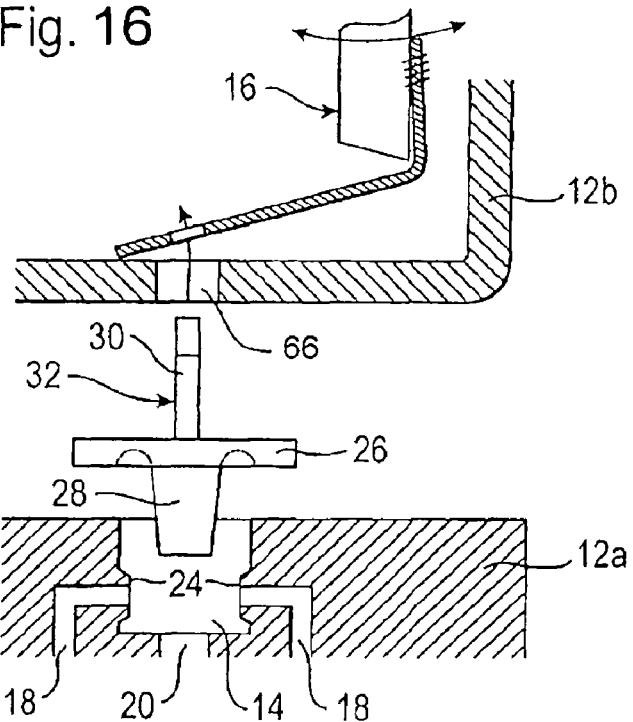
Fig. 17
a)
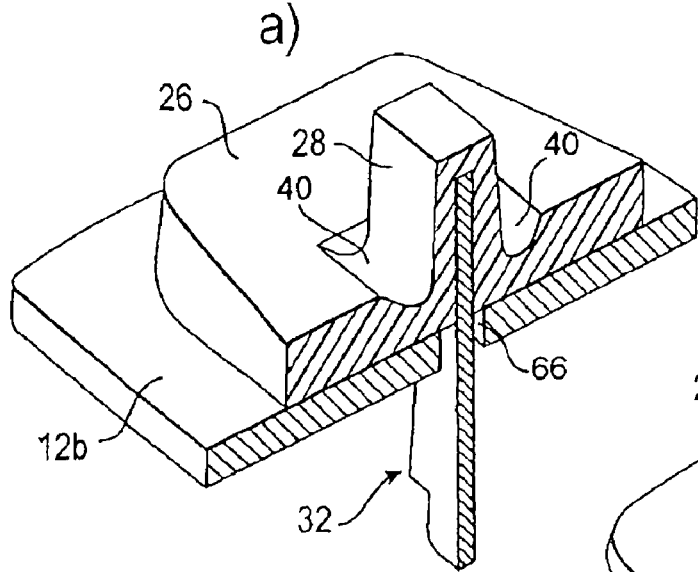
b)
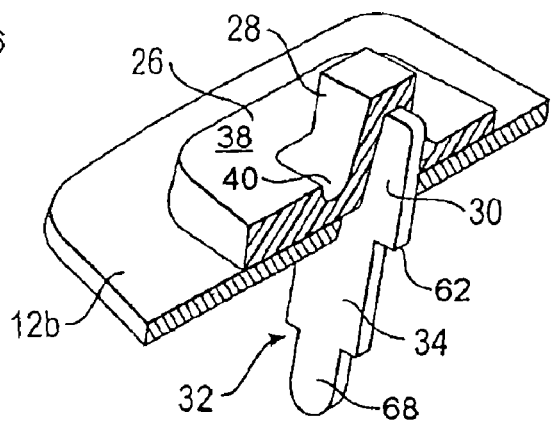

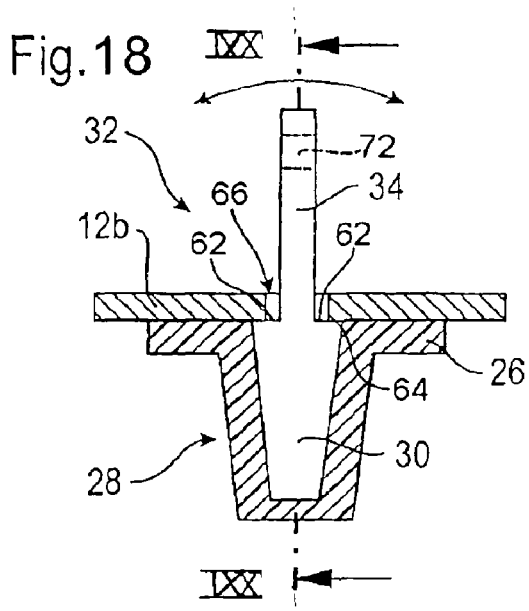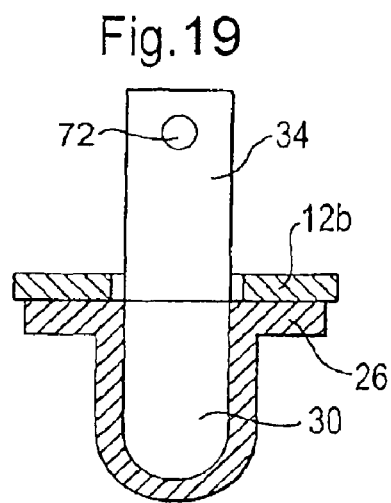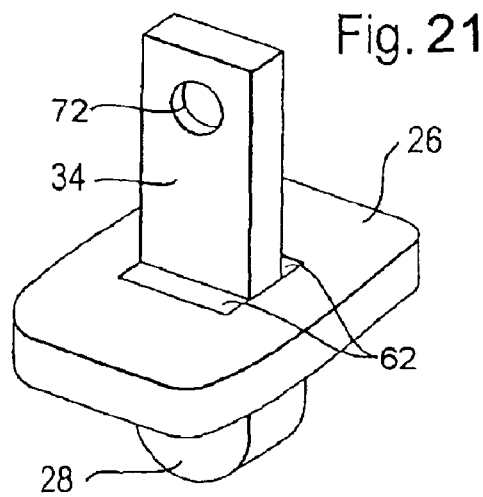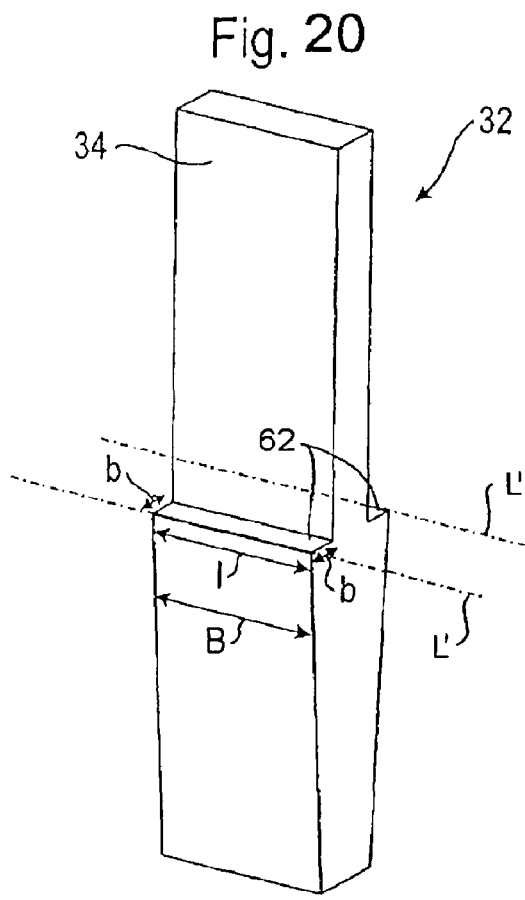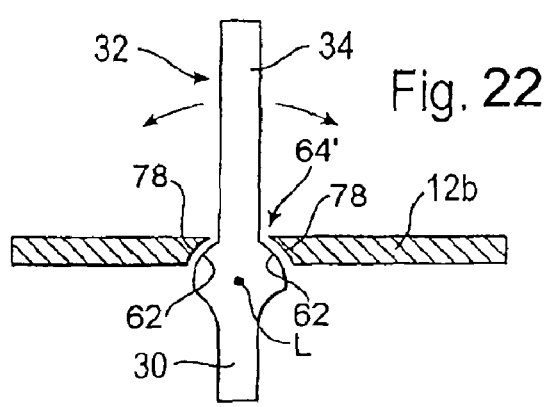

VALVE DEVICE

FIELD OF THE INVENTION

This invention relates to a valve device.

BACKGROUND OF THE INVENTION

From the prior art, valve devices are known, in which a valve space is sealed against a valve drive by means of a sealing body made of an elastic material. To selectively cover or clear a valve seat disposed in the valve space, a two-armed actuating lever is provided, which extends through the sealing body and whose first arm is actuated by the valve drive. The second arm of the actuating lever is inserted in a pocket molded on the sealing body, which also forms the closing body. The sealing body usually is a membrane, which is clamped on its peripheral edge and in its center has the pocket protruding into the valve space. During a swivel movement of the actuating lever, the membrane is subjected to a high load, as it is alternately stretched and compressed in the region around the pocket.

SUMMARY OF THE INVENTION

The invention creates a valve device, in which the sealing body for sealing between valve space and valve drive is deformed only little by the swivel movement of the actuating lever.

In accordance with the invention, this is achieved by a valve device, comprising a valve space formed in a housing, a valve drive sealed against the valve space by means of a sealing body made of an elastic material, a two-armed actuating lever which extends through the sealing body and whose first arm is connected to the valve drive, and a closing body molded on the sealing body, which forms a jacket of the second arm of the actuating lever. By means of a swivel movement of the actuating lever, the closing body can cover or clear a valve seat disposed in the valve space, and the actuating lever has a spatially fixed bearing axis. In contrast to prior art valve devices, in which the axis of rotation for the swivel movement of the lever is located far above the sealing body, or when actuating the lever, its "bearing axis" freely "floats" in the sealing body, i.e. moves in the space, the axis of rotation is placed in the plane of the sealing body, preferably in the middle thereof, in the aspect in accordance with the invention. During the swivel movement of the lever, less elastic deformation of the sealing body thereby is achieved in the vicinity of the bearing axis, which results in a longer service life of the sealing body.

Preferably, the actuating lever has two opposed projections, which extend along the bearing axis inside the sealing body. The projections can extend across almost the entire width of the sealing body; however, it is likewise possible to merely form comparatively small lugs on the lever. In both cases, the projections serve the fixation of the lever in the sealing body. In addition, the bearing axis, which is not defined precisely in the prior art, is fixed by the projections.

In accordance with a first embodiment of the invention, the sealing body has at least one engaging element in the vicinity of the bearing axis, which is in engagement with a complementarily formed engaging element of the housing. In this way, a positive connection between the sealing body and the housing is created in the vicinity of the bearing axis, which serves the fixation of the bearing axis, which thus can no longer be displaced by fulling of the sealing body. Fixing the bearing axis thus can be effected by projections molded on the actuating lever or by a positive connection between sealing body and housing. A combination of the two measures is of course also possible.

In the vicinity of the bearing axis, the sealing body can include a plurality of recesses. On the housing, correspondingly formed protrusions then are provided, which engage in the recesses of the sealing body.

In accordance with a first aspect, the recesses are trenches, which on the side of the sealing body facing away from the valve space extend parallel to the bearing axis on both sides. Alternatively, the recesses can be depressions, which on the side of the sealing body facing away from the valve space are arranged on both sides of the bearing axis.

In accordance with a further aspect, the sealing body has indentations on two opposed sides intersecting the bearing axis, which extend over the entire thickness of the sealing body. Thus, the sealing body is formed "more narrow" in the vicinity of the bearing axis. As seen from the valve space, it approximately has the shape of an hour glass, which ensures the fixation of the lever.

Alternatively, the sealing body can have at least one thickened portion in the vicinity of the bearing axis. The same engages in a corresponding recess in the housing and thus provides a positive connection.

Preferably, the thickened portion is a bead interrupted by the actuating lever, which on the side of the sealing body facing away from the valve space extends along the bearing axis.

There can also be provided two beads, which on the side of the sealing body facing away from the valve space extend parallel to the bearing axis on both sides, whereby the bearing axis is fixed.

In accordance with a further aspect, a plurality of knobs are provided, which on the side of the sealing body facing away from the valve space are arranged on both sides of the bearing axis.

In accordance with a second embodiment of the invention, a bearing surface on the housing and two bearing shoulders formed in the transition region of the lever arms are provided, which are supported free of the jacket and directly on the bearing surface of the housing. The metallic actuating lever thus supports directly on the metallic bearing surface of the housing via the bearing shoulders likewise made of metal. This provides a defined bearing with a particularly close tolerance. A further advantage of this aspect consists in that the actuating lever cannot be pushed out of the sealing body by the internal pressure in the valve space. In addition, forces of movement acting on the actuating lever from outside do not lead to the lever moving out of the sealing body.

Preferably, the bearing shoulders are steps, and the first arm of the actuating lever has a width reduced by the steps. By means of this configuration, a particularly small overall width can be achieved, which substantially is determined by the width of the second arm with the jacket surrounding the same and not by the valve drive connected to the first arm.

In particular, the steps are mounted on the bearing surface of the housing substantially line-shaped, whereby the bearing or swivel axis for the actuating lever is defined particularly exactly. In addition, the occurring friction can be reduced in this way.

In accordance with a preferred aspect, the first arm of the actuating lever is tapered proceeding from the bearing shoulders towards its free end. The taper serves as an insertion aid and as a seal in the casting mold when manufacturing the sealing body by casting around the second arm.

Advantageously, the first arm of the actuating lever has a formation for coupling to the valve drive at its free end. Via this formation, the force of movement is introduced into the actuating lever.

The formation preferably forms no broadening of the first lever arm, whereby a small overall width of the valve device is obtained. In addition, such actuating lever can more easily be inserted in a casting mold when manufacturing the sealing body.

In particular, the formation is formed by at least one molded projection, at least one indentation and/or at least one internal recess. The valve drive then preferably is formed complementary to the chosen formation such that a positive connection can be made.

In an alternative aspect of the invention, a valve device is provided, comprising a valve space formed in a housing, a valve drive sealed against the valve space by means of a sealing body made of an elastic material, a two-armed rigid actuating lever which extends through the sealing body and whose first arm is connected to the valve drive, and a closing body molded on the sealing body, which forms a jacket of the second arm of the actuating lever. Furthermore, a bearing portion on the housing and two bearing shoulders formed on the transition region of the lever arms are provided, which in their longitudinal direction substantially extend across the entire width of the actuating lever and are supported free of the jacket and directly on the bearing portion of the housing, wherein the closing body can cover or clear a valve seat disposed in the valve space by a swivel movement of the actuating lever about a bearing axis extending parallel to the longitudinal direction of the bearing shoulders. In this aspect, too, the actuating lever made of metal directly supports on another metal part via its bearing shoulders, namely on the bearing portion of the housing, whereby there is likewise obtained a particularly precise bearing.

A preferred development of this valve device provides that the swivel movement is effected in dependence on the direction of movement about one of two spatially fixed bearing axes. Each of the bearing axes extends along the outer edge of a bearing shoulder.

In an alternative aspect it is provided that the bearing shoulders are formed by convexly curved surfaces, which support on associated mating surfaces in the bearing portion of the housing. The bearing of the actuating lever thus resembles a kind of two-dimensional ball joint in the plane of the swivel movement (vertical to the bearing or swivel axis).

Preferably, a single spatially fixed bearing axis again exists in the case of such "ball joint".

In all embodiments described above, the sealing body preferably is clamped in the housing in the direction of the spatial extension of the lever. This means that the forces for sealing to the outside (i.e. towards the valve drive) extend in the same direction as the lever, so that the bearing in the sealing body is completely relieved of sealing forces. The sealing forces thus have no or only little influence on the movability of the lever in the bearing.

On its side facing the valve space, the sealing body advantageously has recesses on both sides of the closing body. Said recesses serve to reduce the force required for actuating the lever, which is desirable in particular when the sealing body has thickened portions for fixing the bearing in the vicinity of the bearing axis.

Preferably, the maximum width of the valve device in the direction of the bearing axis is 4.5 mm. The valve device of the invention thus can be used for a variety of applications which require so-called miniaturized valves, for instance in the field of medicine or chemistry.

BRIEF DESCRIPTION OF THE DRAWINGS

Further features and advantages of the invention can be taken from the following description of several preferred embodiments with reference to the attached drawing, in which:

FIG. 7 shows a sectional view of an actuating lever with sealing body and associated bearing surface, which is used in the valve device of FIG. 6;

FIG. 8 shows a section through the actuating lever with sealing body and bearing surface along line VIII-VIII in FIG. 7;

FIG. 9 shows a perspective view of the actuating lever with sealing body from FIG. 7;

FIG. 10 shows a perspective view of an alternative actuating lever with sealing body and bearing surface, partly in section;

FIG. 11 shows a detailed perspective view of a slightly modified actuating lever;

FIGS. 14a to 14c show views of further alternative aspects of the free end of the first arm of the actuating lever;

FIGS. 15a to 15c show schematic representations of various possibilities for coupling the first arm of the actuating lever to the valve drive;

FIG. 16 shows a schematic representation of the assembly of a valve device in accordance with the invention;

FIGS. 17a and 17b show perspective views of the side of the sealing body facing the valve space, partly in section;

FIG. 18 shows a sectional view of an actuating lever with sealing body and bearing surface for a valve device in accordance with a third embodiment;

FIG. 19 shows a section along line IXX-IXX in FIG. 18;

FIG. 20 shows a perspective view of the actuating lever from FIG. 18;

FIG. 21 shows a perspective view of the actuating lever with sealing body from FIG. 18; and FIG. 22 shows a sectional view of an actuating lever with associated bearing portion, which is slightly modified with respect to FIG. 18.

DESCRIPTION OF THE PREFERRED EMBODIMENTS

Figure 1:
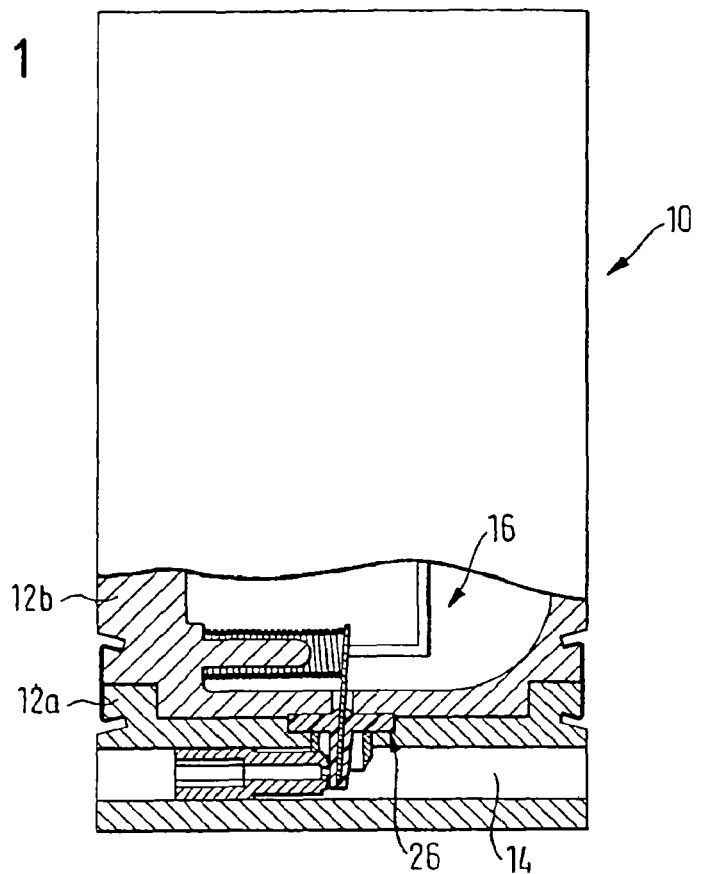
FIG. 1 shows a partly sectional view of a valve device in accordance with a first embodiment of the invention.

FIG. 1 shows a valve device 10, which includes a two-part housing 12a, 12b, a valve space 14 formed in a first housing part 12a and a valve drive 16 disposed in a second housing part 12b. Preferably, the valve device 10 is a so-called miniaturized valve, which has a particularly small overall width of less than 6 mm, preferably only about 4.5 mm. The valve space 14 (with the surrounding housing part 12a) on the one hand and the valve drive 16 on the other hand form two independent components connected with each other. The valve drive 16 is a magnetic drive constructed according to the clapper principle. Other valve drives are, however, also possible, in particular drives with novel actuators such as piezo-electric or MSM actuators.

Figure 2:
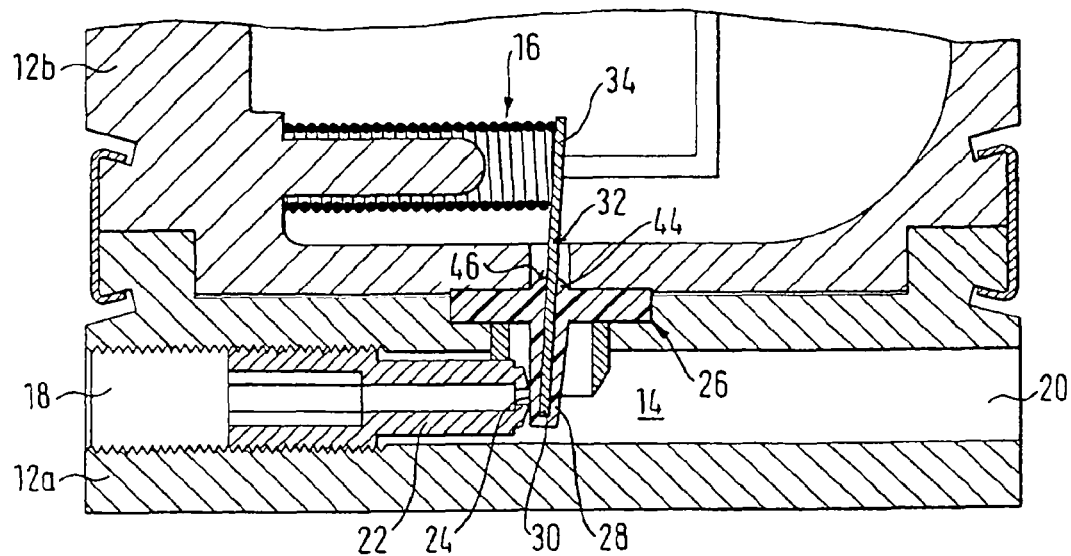
FIG. 2 shows an enlarged sectional view of a valve space of the valve device of FIG. 1.

Two flow passages for a fluid medium open into the valve space 14, one of which constitutes an inlet passage 18 and the other one an outlet passage 20 (see FIG. 2). A rotary body 22, which includes a valve seat 24, is screwed into the inlet passage 18. Between the housing parts 12a, 12b, a sealing body 26 made of an elastic material is clamped, which seals the valve space 14 against the valve drive 16 and thus provides a separation of media.

Figure 3:
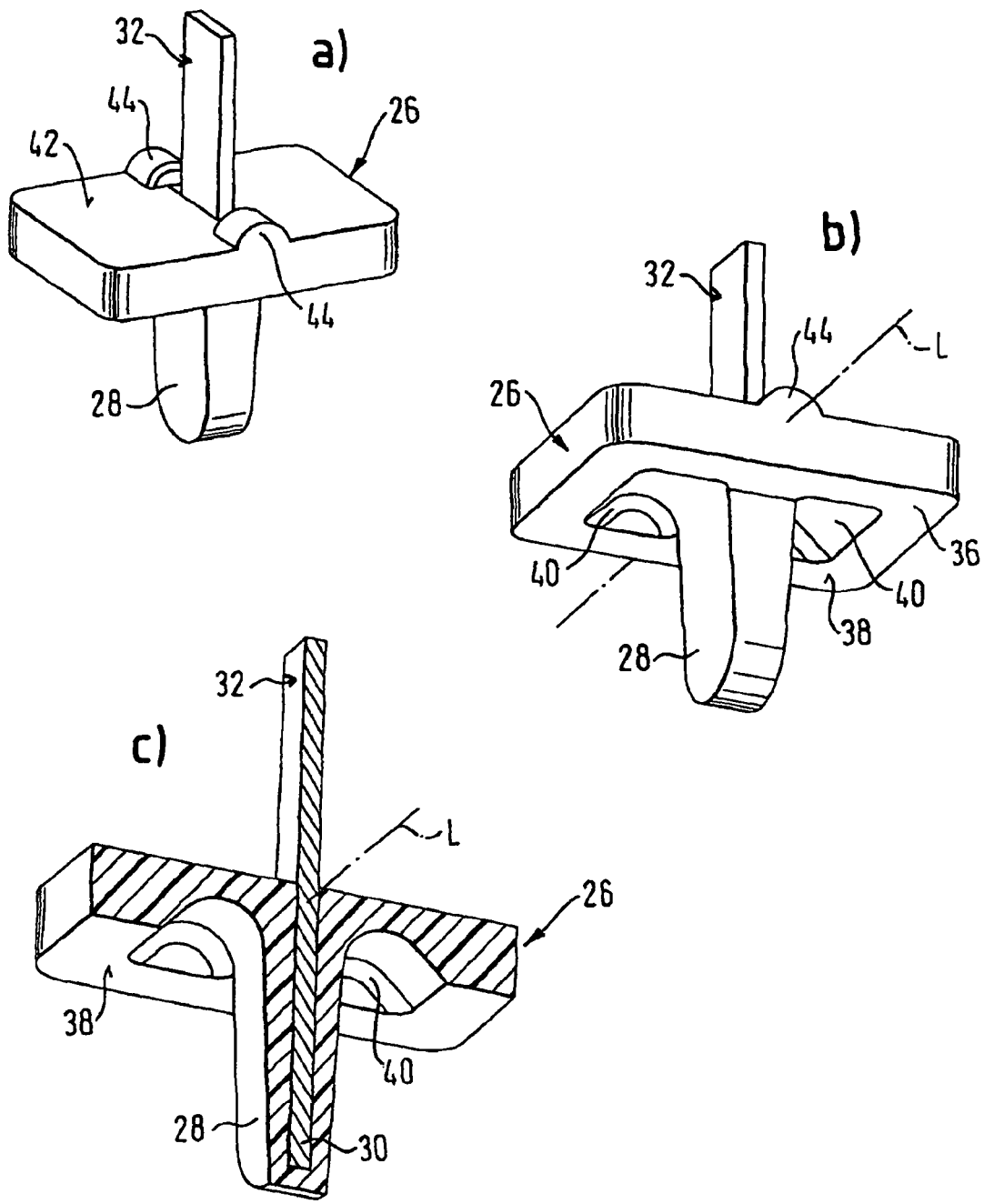
FIGS. 3a to 3c show perspective views of a sealing body in accordance with a first aspect, partly in section.

On the substantially plate-like sealing body 26, which is separately shown in FIGS. 3a to 3c, a closing body 28 is molded, which forms a jacket for a tongue-like second arm 30 of a metallic two-armed actuating lever 32. A first arm 34 of the actuating lever 32 is connected to the valve drive 16 and can be actuated by the same. The actuating lever 32 extends through the sealing body 26.

As shown in FIGS. 3a to 3c, the sealing body 26 in accordance with a first aspect includes a circumferential sealing frame 36, which is clamped between the housing parts 12a, 12b such that the forces necessary for sealing extend vertically, i.e. in the same direction as the spatial extension of the lever 32. When the lever 32 is actuated, the main component of the drive force therefore acts on the actuating lever 32 largely vertically and hence also vertical to the sealing force to the outside. In the aspect in accordance with the invention, the sealing force required for media separation consequently has no or only little influence on the movability of the lever 32 in the bearing. Since the aspect in accordance with the invention in addition is pressure-compensated, it is characterized by very small adjusting forces as compared to unilaterally pressurized membranes.

On both sides of the closing body 28, there is additionally provided one recess 40 each on the lower side 38 facing the valve space 14, which provides for a further reduction of the force required for actuating the lever 32. On the side 42 of the sealing body 26 facing the valve drive 16 (the upper side in the Figures), an engaging element is provided in the form of a two-piece bead 44, which extends along a bearing axis L of the lever 32 with respect to the sealing body 26. The bead 44 positively engages in a complementarily shaped recess 46 in the housing part 12b of the valve device 10. The otherwise "floating" bearing axis L is fixed thereby.

In FIGS. 4a to 4f, alternative aspects of the sealing body 26 are shown, which can be used in the valve device 10 of the invention. Instead of the two-piece bead 44 (see also FIG. 4e), two beads 48 can be provided (FIG. 4f), which on the side 42 facing away from the valve space 14 are arranged on both sides of the lever 32 parallel to the bearing axis L. It is likewise possible to achieve the positive connection between the sealing body 26 and the housing part 12b by means of a plurality of knobs 50 disposed on the sealing body 26 (see FIG. 4d).

Figure 4:
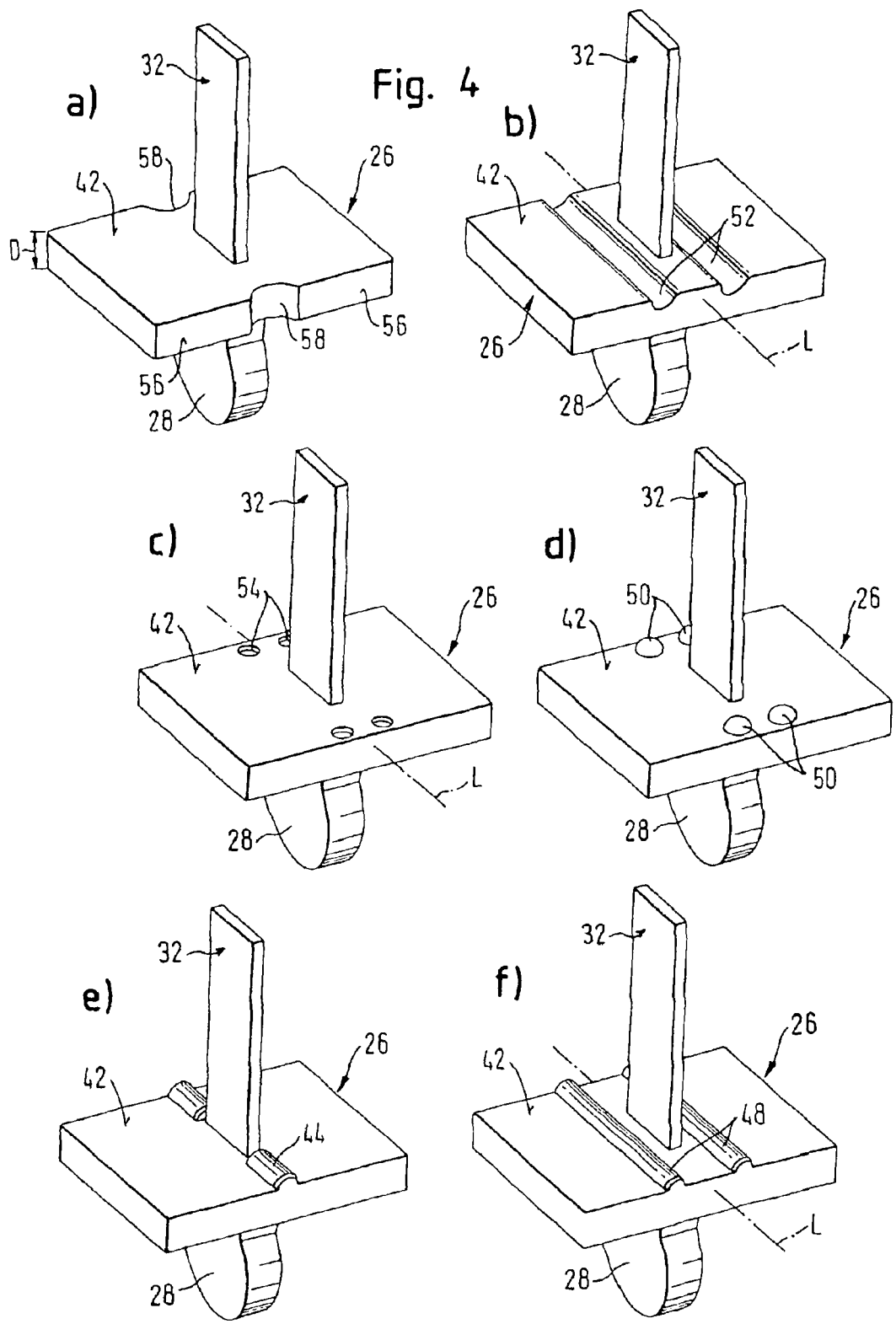
FIGS. 4a to 4f show perspective views of further aspects of sealing bodies.

Instead of thickened portions in the form of beads or knobs, recesses can of course also be provided on the sealing body 26, in which engage corresponding protrusions of the housing part 12b, in order to make a positive connection. As shown in FIG. 4b, the recesses can be two trenches 52 disposed on both sides of the bearing axis L and parallel to the same, which extend on the side 42 of the sealing body 26 facing away from the valve space 14. It is likewise conceivable to provide hole-type depressions 54 in the vicinity of the bearing axis L (FIG. 4c), in which engage correspondingly shaped knobs of the housing.

In the embodiment of the sealing body 26 shown in FIG. 4a, indentations 58 are provided on the two opposed sides 56 intersected by the bearing axis L, which extend over the entire thickness D of the sealing body 26. As a result, the sealing body 26 (in a top view of the side 42) approximately has the shape of an hour glass.

All different shapes of the sealing body 26 shown in FIGS. 4a to 4f serve to positively couple the same with the housing in the vicinity of the bearing axis L, in order to prevent the bearing axis L from "floating" in the sealing body 26. In operation of the valve device 10, when the actuating lever 32 is moved between a closing position, in which the closing body 28 covers the valve seat 24, and an opening position, in which the closing body 28 clears the valve seat 24, it is prevented that the bearing axis L is laterally displaced by fulling of the sealing body 26.

Figure 5:
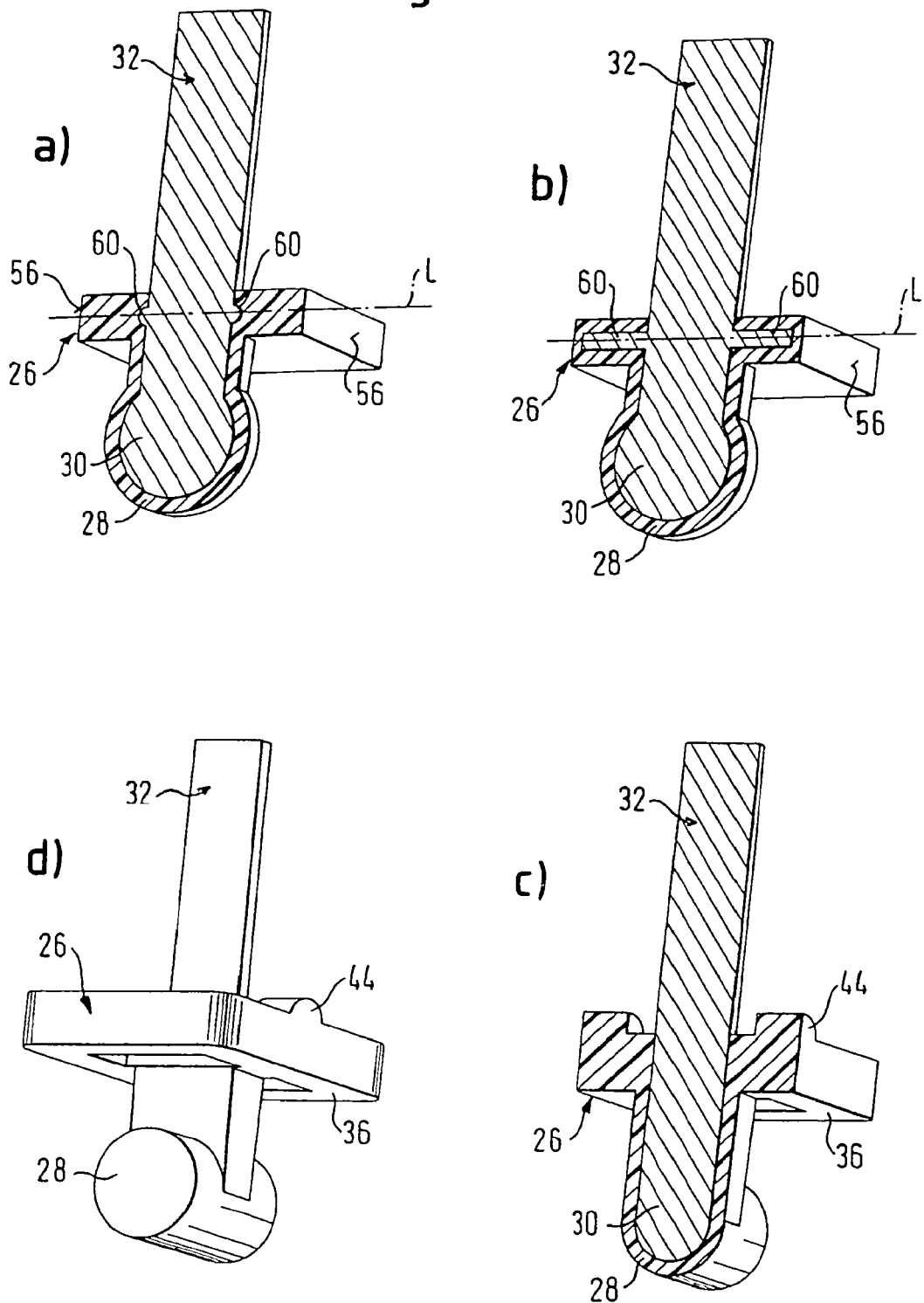
FIGS. 5a to 5c show sectional views of three more aspects of sealing bodies.
FIG. 5d shows a perspective view of the sealing body of FIG. 5c.

FIG. 5a shows a further variant of a sealing body 26, in which the actuating lever 32 has projections 60 on both sides, which extend along the bearing axis L inside the sealing body 26. As shown in FIG. 5a, the projections 60 merely can be small attachments; however, they can also extend over almost the entire width of the sealing body 26 (FIG. 5b). In both cases, the projections 60 serve the spatial fixation of the bearing axis L in the sealing body 26. The lever 32 with the molded projections 60 as shown in FIGS. 5a and 5b can of course also be combined with any of the shapes of the sealing body 26 as shown in FIGS. 4a to 4f, in order to obtain an optimized bearing point of the lever 32 in the sealing body 26.

Fixing the bearing point can, however, also be effected exclusively by a positive connection between sealing body 26 and housing, without attachments being present on the actuating lever 32 (see FIGS. 5c, 5d). In the illustrated aspect, the closing body 28 includes cylindrical protrusions on both sides of the second arm 30.

Figure 6:
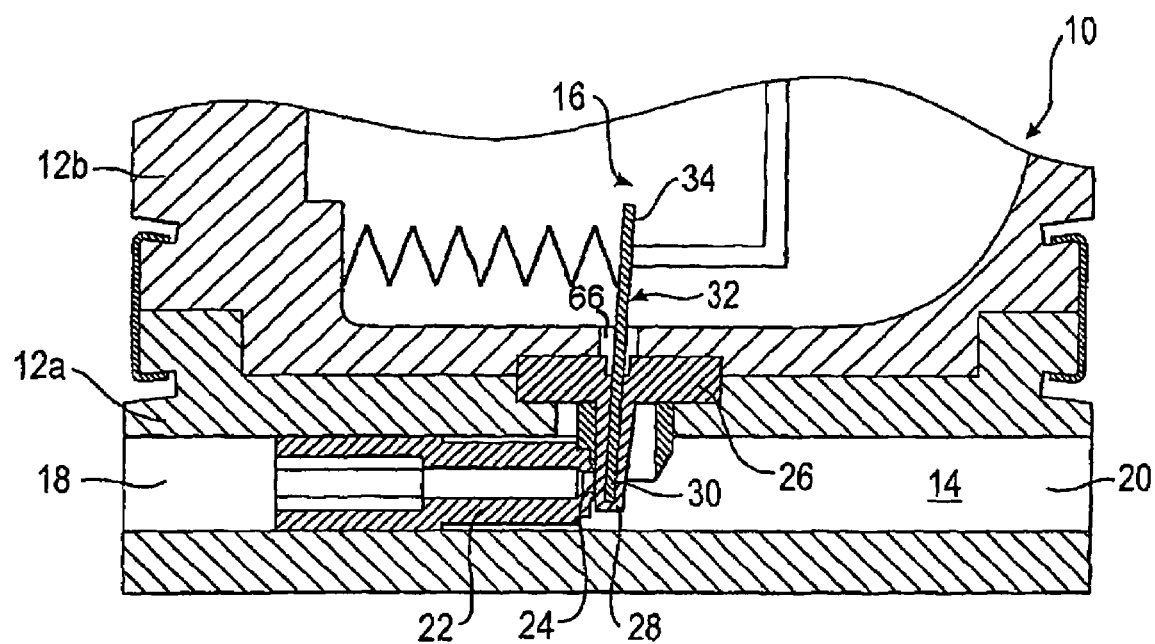
FIG. 6 shows a partly sectional view of a valve device in accordance with a second embodiment of the invention.

FIG. 6 shows a valve device 10 in accordance with a second embodiment of the invention. In the following, identical components or components with the same function are designated with the same reference numerals, and only the differences with respect to the above-described valve device will be discussed. As shown in FIG. 6, the sealing body 26 here has no engaging element for fixing the bearing point.

In the transition region from the first lever arm 34 to the second lever arm 30, two bearing shoulders 62 are provided in the form of steps (see in particular FIG. 8), wherein the first arm 34 of the actuating lever 32 has a width B reduced by the steps with respect to the second arm 30, which again constitutes a kind of tongue. As shown e.g. in FIG. 9, the bearing shoulders 62 are free of the jacket and are approximately flush with the plate of the sealing body 26 towards the valve drive 16. As a result, the bearing shoulders 62 support directly on a bearing surface 64 of the housing, to be more precise of the housing part 12b. The housing part 12b includes a recess 66 for the passage of the actuating lever 32, which is oversized with respect to the dimensions of the first arm 34.

The arrows in FIG. 7 indicate the swivel movement of the actuating lever 32, which means that here the fixed swivel or bearing axis L extends vertical to the drawing plane (FIG. 7) and thus along the bearing shoulders 62, as also shown in FIG. 8. By means of a swivel movement of the actuating lever 32, the valve seat 24 can be covered or cleared by the closing body 28. As explained already, in the aspect of the invention the metallic actuating lever 32 directly supports on the likewise metallic bearing surface 64 of the housing, whereby a defined bearing is formed.

Further advantages of the aspect with the bearing shoulders 62 consist in that as a result of the support of the bearing shoulders 62 on the bearing surface 64, the actuating lever 32 cannot be pushed out as a result of the internal pressure in the valve space 14 and neither moves out of the sealing body 26 as a result of forces of movement acting on the actuating lever 32 from outside.

FIG. 11 shows a particularly advantageous aspect of the bearing shoulders 62, which here are tapered upwards, i.e. towards the valve drive 16, so that a line-shaped support on the bearing surface 64 is obtained.

Figure 12:
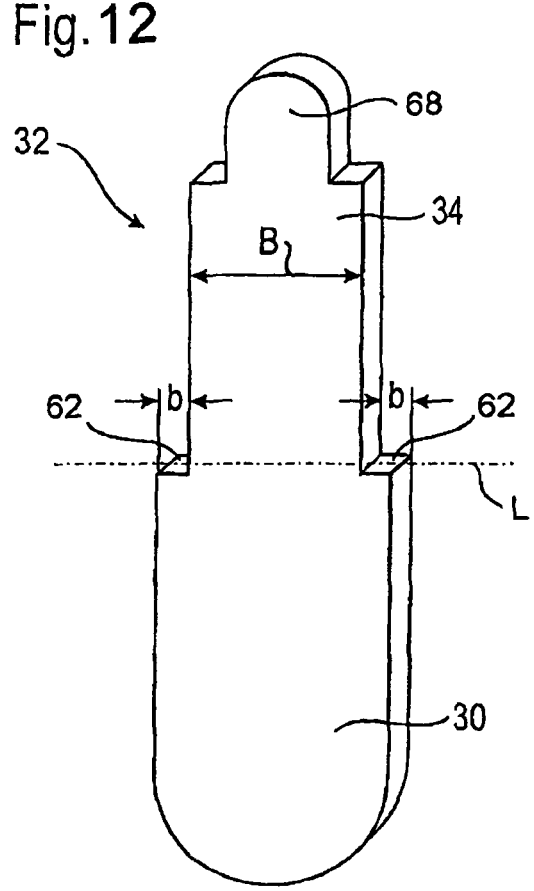
FIG. 12 shows a perspective view of a further actuating lever.

In FIG. 12, a single actuating lever 32 is shown, As can easily be recognized, the first arm 34 has a width B reduced with respect to the second arm 30 by the width b of the bearing shoulders 62 formed as steps. The bearing axis L of the actuating lever 32 extends along the bearing shoulders 62, to be more precise in the direction of their width b. At the free end of the first arm 34, the actuating lever 32 in addition has a molded projection 68, which represents a formation for coupling to the valve drive 16. As shown here, the same can be rounded towards the free end or, as illustrated in FIG. 14a, angular. Further possibilities for the design of the formation are shown in FIGS. 14b and 14c. Beside molded projections 68, the formation can be formed by one or more indentations 70 or by an internal recess 72. Internal recesses in particular are uncritical against overcoating. Beside the illustrated variant, a number of further variants are conceivable; above all, it is important that the formation is suitable for coupling to the valve drive 16 and possibly does not broaden the first lever arm 34. It is of course also possible to completely omit such formation (FIG. 10).

Various possibilities for coupling the valve drive 16 to the first arm 34 are shown in FIGS. 15a to 15c. The portion of the valve drive 16, which is in engagement with the actuating lever 32, each is designed complementary to the free end of the first arm 34.

Figure 13:
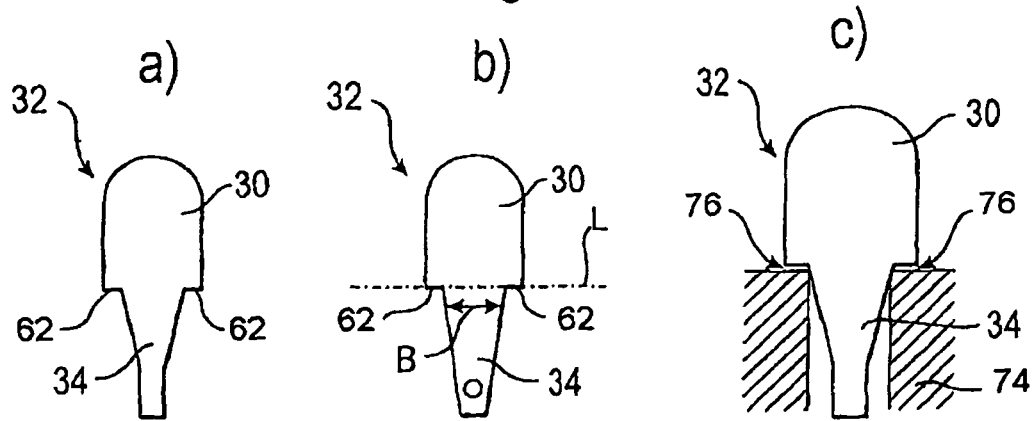
FIGS. 13a to 13c show views of further actuating levers and the positioning thereof in a casting mold.

As shown in FIG. 13, the first arm 34 of the actuating lever 32 also can be tapered from the bearing shoulders 62, here the steps, towards its free end. For this purpose, the width B of the first arm 34 can decrease along its entire length, as shown in FIG. 13b, or the taper is restricted to a portion adjoining the bearing shoulders 62 (FIG. 13a). The taper of the first arm 34 serves the sealing in a casting mold 74 when manufacturing the sealing body 26 of an elastomer (FIG. 13c). The sealing points are designated with reference numeral 76. In addition, this formation facilitates insertion of the actuating lever 32 both into the casting mold 74 and during assembly of the valve device 10 (see FIG. 16). This Figure shows an aspect with two inlet passages 18 and one common outlet passage 20.

To reduce the force required for the swivel movement of the actuating lever 32, the sealing body 26 can each have a recess 40 on its side 38 facing the valve space 14 on both sides of the closing body 28, as shown in FIGS. 17a and 17b.

FIGS. 18 to 22 finally show a third embodiment of the valve device 10 of the invention, which chiefly differs from the valve device 10 of FIGS. 6 to 17 in that by means of the bearing shoulders 62 a broadening of the actuating lever 32 is achieved in the swivel plane, which in the case of FIG. 18 coincides with the drawing plane. Proceeding from the bearing shoulders 62, which again are designed as steps, the second arm 30 of the actuating lever 32 is tapered towards its free end. As shown in particular in FIG. 20, the bearing shoulders 62 substantially extend over the entire width B of the actuating lever 32 in their longitudinal direction I, and the respective bearing axis L' extends parallel to this longitudinal direction I of the bearing shoulders 62. It should be noted that in the aspect of FIGS. 18 to 21 two spatially fixed swivel or bearing axes L' are provided, depending on the direction in which the lever 32 is actuated. The bearing axis L' dependent on the swivel direction of the actuating lever 32 then each coincides with the outer edge of a bearing shoulder 62.

In the slightly modified aspect as shown in FIG. 22, the bearing shoulders 62 are formed by convexly curved surfaces, which support on associated mating surfaces 78 in a bearing portion 64' of the housing. This provides a kind of two-dimensional ball joint with a single, spatially fixed bearing axis L, which extends vertical to the drawing plane. The representation of the sealing body 26 was omitted in FIG. 22 for reasons of clarity.

It is of course up to one of skill in the art to use all the described features of the various embodiments both individually and in combination with each other.

The invention claimed is:

1. A valve device, comprising
a valve space formed in a housing,
a valve drive sealed against the valve space by means of a sealing body made of an elastic material,
a two-armed actuating lever, which extends through the sealing body and whose first arm is connected to the valve drive, and
a closing body molded on the sealing body, which forms a jacket of the second arm of the actuating lever,
wherein the closing body can cover or clear a valve seat disposed in the valve space by a swivel movement of the actuating lever, and
wherein the actuating lever has a spatially fixed bearing axis,
said sealing body including a plurality of recesses in the vicinity of the bearing axis, wherein the recesses are trenches, which on the side of the sealing body facing away from the valve space extend parallel to the bearing axis on both sides.

2. A valve device, comprising
a valve space formed in a housing,
a valve drive sealed against the valve space by means of a sealing body made of an elastic material,
a two-armed actuating lever, which extends through the sealing body and whose first arm is connected to the valve drive, and
a closing body molded on the sealing body, which forms a jacket of the second arm of the actuating lever,
wherein the closing body can cover or clear a valve seat disposed in the valve space by a swivel movement of the actuating lever, and
wherein the actuating lever has a spatially fixed bearing axis,
wherein on two opposed sides, which intersect the bearing axis, the sealing body has indentations which extend over the entire thickness of the sealing body.

3. A valve device, comprising
a valve space formed in a housing,
a valve drive sealed against the valve space by means of a sealing body made of an elastic material,
a two-armed actuating lever, which extends through the sealing body and whose first arm is connected to the valve drive, and
a closing body molded on the sealing body, which forms a jacket of the second arm of the actuating lever,
wherein the closing body can cover or clear a valve seat disposed in the valve space by a swivel movement of the actuating lever, and
wherein the actuating lever has a spatially fixed bearing axis, wherein the sealing body has at least one thickened portion in the vicinity of the bearing axis and wherein the thickened portion is a bead interrupted by the actuating lever, which on the side of the sealing body facing away from the valve space extends along the bearing axis.

4. A valve device, comprising a valve space formed in a housing, a valve drive sealed against the valve space by means of a sealing body made of an elastic material, a two-armed actuating lever, which extends through the sealing body and whose first arm is connected to the valve drive, and a closing body molded on the sealing body, which forms a jacket of the second arm of the actuating lever, wherein the closing body can cover or clear a valve seat disposed in the valve space by a swivel movement of the actuating lever, and wherein the actuating lever has a spatially fixed bearing axis, wherein the sealing body has at least one thickened portion in the vicinity of the bearing axis and wherein two beads are provided, which on the side of the sealing body facing away from the valve space extend parallel to the bearing axis on both sides.

5. A valve device, comprising a valve space formed in a housing, a valve drive sealed against the valve space by means of a sealing body made of an elastic material, a two-armed actuating lever, which extends through the sealing body and whose first arm is connected to the valve drive, and a closing body molded on the sealing body, which forms a jacket of the second arm of the actuating lever, wherein the closing body can cover or clear a valve seat disposed in the valve space by a swivel movement of the actuating lever, and wherein the actuating lever has a spatially fixed bearing axis, wherein the sealing body has at least one thickened portion in the vicinity of the bearing axis and wherein a plurality of knobs are provided, which on the side of the sealing body facing away from the valve space are arranged on both sides of the bearing axis.

6. A valve device, comprising a valve space formed in a housing, a valve drive sealed against the valve space by means of a sealing body made of an elastic material, a rigid two-armed actuating lever, which extends through the sealing body and whose first arm is connected to the valve drive, said actuating lever including a transition region of the lever arms, a closing body molded on the sealing body, which forms a jacket of the second arm of the actuating lever, a bearing portion on the housing, and two bearing shoulders formed in the transition region of the lever arms, which in their longitudinal direction substantially extend over the entire width of the actuating lever and are supported free of the jacket and directly on the bearing portion of the housing, wherein the closing body can cover or clear a valve seat disposed in the valve space by a swivel movement of the actuating lever about a bearing axis extending parallel to the longitudinal direction of the bearing shoulders.

7. The valve device according to claim 6, including two bearing axes extending parallel to the longitudinal direction of the bearing shoulders, wherein the swivel movement is effected in dependence on the direction of movement about one of said two spatially fixed bearing axes.

8. The valve device according to claim 6, wherein the bearing shoulders are formed by convexly curved surfaces, which support on associated mating surfaces in the bearing portion of the housing.

9. The valve device according to claim 8, wherein the swivel movement is effected about a spatially fixed bearing axis.

10. The valve device according to claim 6, wherein the sealing body is clamped in the housing in the direction of the spatial extension of the lever.

11. The valve device according to claim 6, wherein on its side facing the valve space, the sealing body has recesses on both sides of the closing body.

12. The valve device according to claim 6, wherein its maximum width in the direction of the bearing axis is 4.5 mm.

* * * * *